US012770642B2

(12) United States Patent
Karabinis

(10) Patent No.: US 12,770,642 B2
(45) **Date of Patent: *Oct. 20, 2026**

(54) SYSTEMS/METHODS OF REDUCING LATENCY IN COMMUNICATIONS

(71) Applicant: ENK Wireless, Inc., Cary, NC (US)

(72) Inventor: Peter D. Karabinis, Cary, NC (US)

( * ) Notice: Subject to any disclaimer, the term of this patent is extended or adjusted under 35 U.S.C. 154(b) by 163 days.

This patent is subject to a terminal disclaimer.

(21) Appl. No.: 18/976,677

(22) Filed: Dec. 11, 2024

(65) Prior Publication Data

US 2025/0104731 A1 Mar. 27, 2025

Related U.S. Application Data

(63) Continuation of application No. 17/647,387, filed on Jan. 7, 2022, now Pat. No. 12,205,615.

(Continued)

(51) Int. Cl.
*H04M 3/00* (2024.01)
*G10L 15/02* (2006.01)

(Continued)

(52) U.S. Cl.
CPC .............. *G10L 25/87* (2013.01); *G10L 15/02* (2013.01); *G10L 15/22* (2013.01);

(Continued)

(58) Field of Classification Search
CPC ... H04L 47/30; H04L 43/0858; H04L 43/106; H04L 47/283; H04L 65/1059;

(Continued)

(56) References Cited

U.S. PATENT DOCUMENTS 10,735,120 B1 * 8/2020 Kantharaju ........... H04L 43/087
2003/0055954 A1 * 3/2003 Kavanagh ........... H04L 61/4511 709/224

(Continued)

OTHER PUBLICATIONS

United States Patent and Trademark Office, "Non-Final Office Action", U.S. Appl. No. 17/647,387, filed Jun. 7, 2024, 15 pgs.

(Continued)

*Primary Examiner* — Kharye Pope
(74) *Attorney, Agent, or Firm* — Carlson, Caspers, Vandenburgh & Lindquist, P.A.

(57) ABSTRACT

Systems/methods are disclosed wherein a resource is allocated for communicating voice information via a packet-switched connection. Using the allocated resource, a first plurality of packets is transmitted comprising first voice information that is based on a first voice activity that is detected over a first interval of time. Then, over a second interval of time that follows the first interval of time and is devoid of voice information to be transmitted, the resource that has been allocated is maintained unaltered and not used for any purpose other than for said communicating voice information between the first device and the second device. Then, over an interval of time that follows the second interval of time and includes new voice activity, the resource that has been allocated, maintained unaltered and unused over the second interval of time is used to transmit information packets based on the new voice activity that is detected.

21 Claims, 3 Drawing Sheets

Related U.S. Application Data

(60) Provisional application No. 63/135,947, filed on Jan. 11, 2021, provisional application No. 63/139,389, filed on Jan. 20, 2021, provisional application No. 63/144,186, filed on Feb. 1, 2021.

(51) Int. Cl.

| | |
|---|---|
| ***G10L 15/22*** | (2006.01) |
| ***G10L 25/87*** | (2013.01) |
| ***H04L 12/66*** | (2006.01) |
| ***H04M 5/00*** | (2006.01) |
| ***H04W 72/1263*** | (2023.01) |
| ***H04W 72/23*** | (2023.01) |

(52) U.S. Cl.
CPC ....... *H04W 72/1263* (2013.01); *H04W 72/23* (2023.01); *G10L 2015/025* (2013.01)

(58) Field of Classification Search
CPC ....... H04L 65/65; H04L 65/70; H04L 65/764; H04L 65/80; H04L 67/62; H04L 1/0001; H04M 3/56; H04M 3/568; H04M 7/006; H04M 11/06; H04M 1/253; H04M 11/068; H04M 1/73; G10L 25/78; G10L 19/20; G10L 2025/783; G10L 21/04; G10L 25/87; G10L 19/18; G10L 19/167; H04W 84/12; H04W 8/08; H04W 88/08; H04W 88/181; H04W 88/085; H04W 84/042; H04W 28/22; H04W 28/18; H04W 88/06; H04W 36/30; H04W 52/0222; H04W 52/0225
See application file for complete search history.

(56) References Cited

U.S. PATENT DOCUMENTS

| | | | | |
|---|---|---|---|---|
| 2003/0081115 | A1* | 5/2003 | Curry | H04N 7/15 381/26 |
| 2007/0097936 | A1* | 5/2007 | Lee | H04W 74/02 370/338 |
| 2009/0046639 | A1* | 2/2009 | Cai | H04L 47/50 370/352 |
| 2009/0238145 | A1* | 9/2009 | Shahrier | C07C 43/313 370/331 |
| 2015/0009874 | A1* | 1/2015 | Edara | H04W 72/1268 370/311 |
| 2015/0256456 | A1* | 9/2015 | Previdi | H04L 69/166 370/392 |
| 2018/0176266 | A1* | 6/2018 | Filart | H04L 65/80 |
| 2019/0104058 | A1* | 4/2019 | Filsfils | H04L 69/22 |
| 2019/0132220 | A1* | 5/2019 | Boutros | H04L 12/4633 |
| 2019/0215267 | A1* | 7/2019 | Filsfils | H04L 45/566 |
| 2019/0319858 | A1* | 10/2019 | Das | H04J 3/1652 |
| 2022/0223173 | A1 | 7/2022 | Karabinis | |

OTHER PUBLICATIONS

United States Patent and Trademark Office, "Notice of Allowance and Fees Due", U.S. Appl. No. 17/647,387, filed Sep. 12, 2024, 8 pgs.

* cited by examiner

SYSTEMS/METHODS OF REDUCING LATENCY IN COMMUNICATIONS

RELATED APPLICATIONS

This application is a continuation of U.S. application Ser. No. 17/647,387 filed Jan. 7, 2022, entitled "Systems/Methods of Reducing a Delay/Latency Measure of Communications", which claims the benefit of U.S. Provisional Application Nos. 63/135,947 filed on Jan. 11, 2021, entitled "Systems/Methods of Appending an Identity, Being Notified of an Impending Event and/or Reducing a Traffic Load of Base Stations", 63/139,389 filed on Jan. 20, 2021, entitled "Additional Systems/Methods of Appending an Identity, Being Notified of an Impending Event and/or Reducing a Traffic Load of Base Stations", and 63/144,186 filed on Feb. 1, 2021, entitled "Further Systems/Methods of Appending an Identity, Being Notified of an Impending Event and/or Reducing a Traffic Load of Base Stations", each of which are hereby incorporated herein by reference.

BACKGROUND

Delay during a telephone conversation can lead to one person talking over another person and/or noticeable pauses between listening and speaking during the conversation. It is desirable to reduce this delay as much as possible to provide a more natural conversation when talking on the phone during a voice and/or voice with video call.

SUMMARY

Embodiments described herein provide for a method including establishing a packet-switched connection between a first device and a second device. The method also includes allocating a frequency resource to the packet-switched connection for communicating real-time voice information. The method also includes transmitting a first plurality of packets that include first real-time voice information over the packet-switched connection using the frequency resource, wherein the first plurality of packets correspond to a first interval of time during which first voice activity is detected by the first device or the second device. The method also includes maintaining allocation of the frequency resource to the packet-switched connection during a second interval of time that follows the first interval of time and is devoid of voice activity detected by either the first device or the second device. The method also includes transmitting a second plurality of packets that include real-time voice information over the packet-switched connection using the frequency resource, wherein the second plurality of packets correspond to a third interval of time that follows the second interval of time and during which second voice activity is detected by the first device or the second device.

Embodiments described herein also provide for a method including allocating a frequency resource to a first device for communicating real-time voice information over a packet-switched connection between the first device and a second device. The method also includes detecting, by one of the first device or the second device, first voice activity during a first interval of time. The method also includes creating a first plurality of packets that capture the first voice activity. The method also includes transmitting the first plurality of packets over the packet-switched connection using the frequency resource. The method also includes providing a second interval of time following the first interval of time, during which neither the first device nor the second device detect voice activity. The method also includes maintaining allocation of the frequency resource to the first device during the second interval of time. The method also includes detecting, by one of the first device or the second device, second voice activity during a third interval of time, the third interval of time following the second interval of time. The method also includes creating a second plurality of packets that capture the second voice activity. The method also includes transmitting the second plurality of packets over the packet-switched connection using the frequency resource.

BRIEF DESCRIPTION OF THE FIGURES

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Systems/Methods of Appending an Identity

Figure 1:
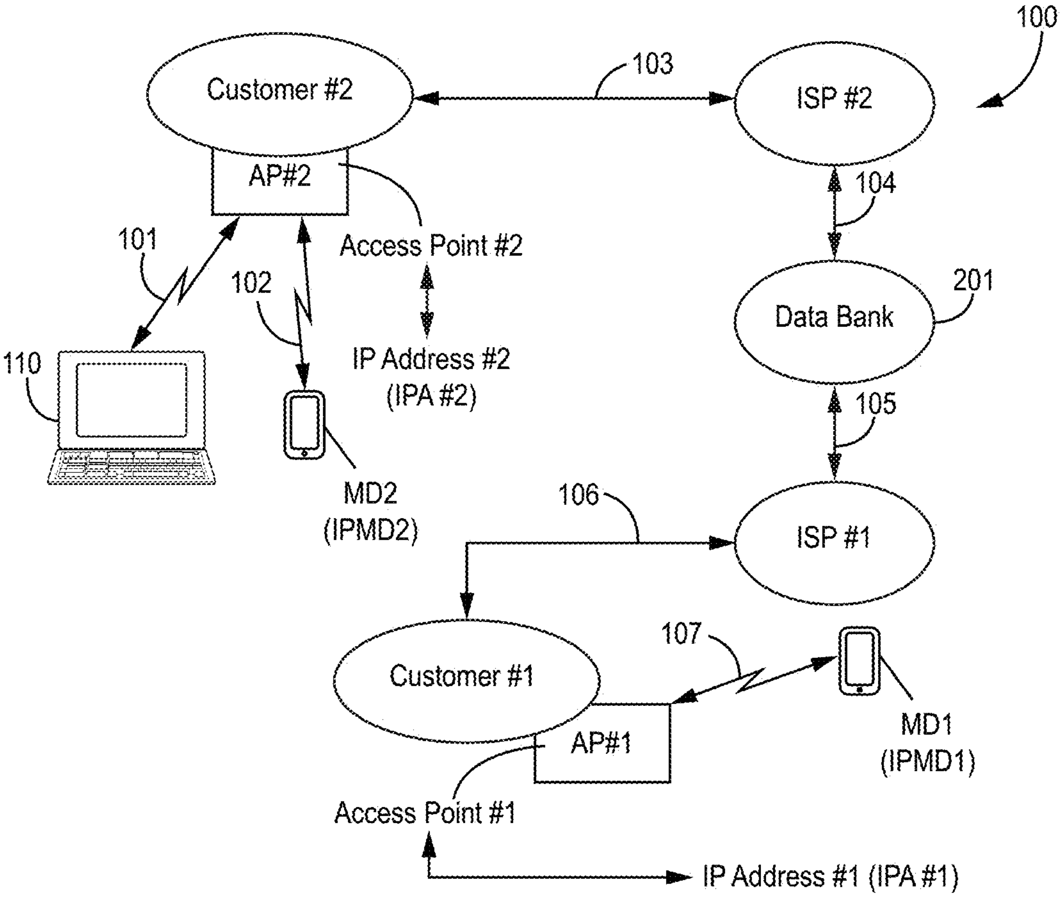
FIG. 1 is a flow diagram illustrating a system/method of communicating between two mobile devices, according to one example embodiment.

An identity (or a coordinate) such as, for example, a phone number, that may be associated with a specific entity, such as, for example, a smartphone of a person, may be appended by, for example, one or more characters or symbols, such as, for example, the symbols "M", "H", "O", "V" so that the appended identity (e.g., the appended phone number) assumes an association that differs from that of the original identity (or original coordinate, or un-appended number). For example, a phone number, such as the phone number (703) 980-0768 may be appended by the symbol M and may thus assume an association with, and/or an identity of, a mobile phone. The same phone number may also, according to some embodiments, be appended with the symbol H and may thus become associated and/or be identified with a residence (or home). The symbol O may be used so that a respective appended version of the phone number, (703) 980-0768-O, may be associated with a phone number of an office. Similarly, a symbol such as V may be used to append the phone number to indicate a place of vacation; etc. Accordingly, an individual may be assigned a single phone number (i.e., a single identity/coordinate) to cover a plurality of devices/locations and connectivity therewith.

According to further embodiments, an identity (or coordinate) that may be deemed desirable because it may be easy to remember, such as, for example a phone number specified as (919) 777-7777, may be appended, repeatedly according to some embodiments, in order to provide service to a plurality of individuals and/or companies. For example, the coordinate (919) 777-7777-ENK may represent a telephone number assigned to ENK Wireless, Inc. whereas (919) 777-7777-ODY may represent a telephone number assigned to Odyssey Wireless, Inc. Further, we may have (919) 777-7777-ENK-NY representing a telephone number of ENK Wireless, Inc. for its New York facility, while we may have the coordinate (919) 777-7777-ENK-LA as a telephone number of ENK Wireless, Inc. for its Los Angeles facility, etc. Other identities/coordinates that may be easy to remember such as, for example, (919) 222-7777, (703) 222-2121, (603) 123-4545 or (800) 765-4321 also may be used and appended; and/or any other variation/combination of symbols that may be deemed easy to remember (and/or may provide a utility, such as, for example, a descriptive utility, may be used and/or appended).

Further, according to some embodiments, instead of a string of numbers such as, for example, (919) 777-7777, or in combination with a string of numbers (or a single number), one or more lower-case letters, upper-case letters and/or other symbols (not necessarily to the exclusion of one or more numbers) may be used to define/identify a destination for a phone call and, more generally, a destination for a telecommunications session that may, according to some embodiments, comprise a wireless telecommunications session comprising a voice call and/or data. In some embodiments, a smartphone keypad/display (or a voice command provided to the smartphone) may be used to write/dial and/or select from a stored list of alternatives a coordinate, such as, for example, the coordinate “peterkarabinis-cary”. Alternatively, if there are multiple persons by the same name in Cary, a first one of said multiple persons may adopt, and be designated by, for example, “peterkarabinis-cary1” while a second one of said multiple persons may use/adopt and be designated by “peterkarabinis-cary2”, etc. Besides the above, or in combination with the above, other distinctions may be used. For example, a first one of the multiple persons may adopt, and be designated by, for example, “Peter Karabinis-Cary” while a second one of the multiple persons may use/adopt, be associated with, and be designated by “Peter Karabinis-Chalon”; wherein Chalon specifies a name of a street associated with a residence of this particular Peter Karabinis. Further, a third one of said multiple persons may be associated with, and use the designation of, “Peter Karabinis-Centurion”; wherein Centurion specifies a street name associated with a residence of this Peter Karabinis. Many other distinctions and/or combinations/variations of the above may be used.

Accordingly, a method/system of initiating/establishing a telecommunications session may be provided comprising: responsive to a voice command and/or any other stimulus that is provided to a device (wherein the device comprises a smartphone in some embodiments; and wherein, in some embodiments, the voice command and/or said any other stimulus is a priori associated with said initiating/establishing the telecommunications session), the device may be configured to present a list of possibilities that correlate with, are associated with and/or relate to the voice command and/or said other stimulus that is provided to the device. For example, if the voice command is: call Mr. Karabinis in Cary, North Carolina (or simply, call Mr. Karabinis in Cary), the device may provide three different possibilities to select from: (1) Mr. Karabinis of Chalon Drive; (2) Mr. Karabinis of Centurion Road; and (3) Mr. Karabinis of 47th Street & 3rd Avenue. Following the user of the device having made a choice from among the three possibilities presented, the device may proceed to initiate the communications session. It will be understood that, in some embodiments, the device may be configured to relay information associated with said voice command and/or said other stimulus to a processing center/facility in order to receive from the processing center/facility the three different possibilities (of “Mr. Karabinis in Cary”) described above. In some embodiments, the other stimulus comprises providing an input to the device using a keypad (or display) of the device. Combinations of the above may be provided.

Systems/Methods of Receiving Notifications of Impending Event(s)

A device may be configured to include near field communications (“NFC”) functionality so that the device may wirelessly exchange information with, for example, a smartphone responsive to the smartphone having been brought in sufficient proximity with the device. In some embodiments, according to inventive concepts presented herein, the device comprises a parking meter. Accordingly, a user of the smartphone who wishes to park a vehicle in a space associated with the parking meter may provide relevant information to the parking meter, either by providing at least some of the relevant information directly to the parking meter and/or by providing at least some of the relevant information to the smartphone and then, via a NFC link between the parking meter and the smartphone, transferring the at least some of the relevant information that has been provided to the smartphone, from the smartphone to the parking meter.

According to some embodiments, the parking meter may be further configured with wireless communications functionality, such as, for example, wireless communications functionality using frequencies of a cellular network (e.g., frequencies of a 4G and/or 5G network), frequencies of an internet of things (“IoT”) network and/or frequencies of any other band of frequencies (such as a band of frequencies that is authorized for provision of satellite-based communications) that comprise licensed frequencies, unlicensed frequencies and/or microwave frequencies that, according to some embodiments, exceed 20 GHz. Accordingly, in some embodiments, the parking meter is configured to communicate with the smartphone wirelessly and at a spatial distance therefrom that exceeds a distance associated with an exchange of information based on NFC and further exceeds a distance associated with said sufficient proximity with the device.

According to some embodiments, following an exchange of information between the parking meter and the smartphone (via the NFC, a communications link other than the NFC and/or manually), the user of the smartphone may, for example, stop at a restaurant to have a meal, go shopping and/or become involved in other endeavors. Accordingly, depending on circumstances that may be unanticipated, a time interval and associated amount of money that has been paid therefor (or will be paid therefor), may be approaching an end/limit associated therewith. The parking meter, however, may be cognizant of the approaching end/limit and may be configured to communicate with the user of the smartphone in order to inform said user of said approaching end/limit, while requesting a response as to whether (or not) the user is willing to purchase an extension of time that may be associated with an additional payment of money. Provided said user agrees to said extension of time, said additional payment of money may be provided to the parking meter and/or to an entity associated therewith (e.g., a bank account). Said additional payment may be made using a credit card that may have already been used to provide an initial payment to the parking meter and/or to an entity associated therewith, via said NFC, communications link other than the NFC and/or manually. Said user, however, may be provided with an option to specify a new credit card or other means for providing the additional payment of money (e.g., by receiving a bill via mail or via e-mail).

It will be understood that instead of and/or in conjunction with the NFC, a wireless technology other than NFC and/or a non-wireless technology may be used to exchange information between the user and the parking meter. Combinations of the above are also possible as those skilled in the art will appreciate. Said wireless technology other than NFC may, in some embodiments, be an IoT technology, a cellular technology (e.g., 4G LTE and/or 5G), an optical technology and/or a microwave technology. In some embodiments, said non-wireless technology may include physically attaching/connecting the smartphone to the parking meter.

Accordingly, a method/system may be provided of monitoring a state of a system and a time interval associated therewith (i.e., a time interval remaining prior to said state of the system changing) and informing a user of the system of said time interval; the method comprising: monitoring a time interval remaining prior to a first state of a system being altered from the first state to a second state; and wirelessly informing a user of the system of the time interval remaining; wherein the time interval remaining is greater than zero; wherein said wirelessly informing comprises wirelessly transmitting a message by the system to a device of the user; wherein, according to some embodiments, said device of the user comprises a smartphone; wherein according to further embodiments, said wirelessly informing comprises wirelessly informing repeatedly; wherein said wirelessly informing repeatedly comprises sending wirelessly by the system a sequence of messages to the smartphone; wherein a first message of the sequence of messages comprises a first time interval that is remaining prior to the state of the system changing and wherein a second message of the sequence of messages comprises a second time interval remaining prior to the state of the system changing; and wherein, according to some embodiments, the second time interval remaining is less than the first time interval remaining.

Systems/Methods of Reducing a Traffic Load of Wireless Infrastructure and/or Reducing a Delay (or Latency) Measure Associated with Communications A voice call and/or other communications that may not be associated with voice may be delivered from a first mobile device ("MD1") to a second mobile device ("MD2"), or from MD1 to a non-mobile device, via one or more access points while avoiding using a base station. FIG. 1 illustrates a system 100 of communicating between two mobile devices, MD1 and MD2; wherein MD1 is associated with a first customer "Customer #1" and/or with internet service provider #1 ("ISP #1"). According to some embodiments, ISP #1 provides to Customer #1, access point #1 ("AP #1"), which may be associated with IP Address #1 ("IPA #1"), as is illustrated in FIG. 1. Similarly, MD2 is associated with a second customer, "Customer #2" who is being serviced by internet service provider #2 ("ISP #2"). Accordingly, ISP #2 provides to Customer #2 access point #2 ("AP #2"), which may be associated with IP Address #2 ("IPA #2"), as is further illustrated in FIG. 1. It will be understood that although the description herein refers primarily to "mobile devices," in some embodiments, one or more non-mobile devices may be used instead of, or in conjunction with, mobile devices. It will also be understood that, according to some embodiments, ISP #2=ISP #1; that is, ISP #2 and ISP #1 may be the same internet service provider or two internet service providers that are associated (or cooperating via a business arrangement) with one another. Further, it will be understood that each of the blocks labeled as "Customer #1" and "Customer #2" in FIG. 1, represents a home and/or business of an associated customer including electronics/cables, passive and/or active, associated therewith. Accordingly, AP #2 is connected to the home and/or business of Customer #2 whereas AP #1 is connected to the home and/or business of Customer #1.

Figure 2:
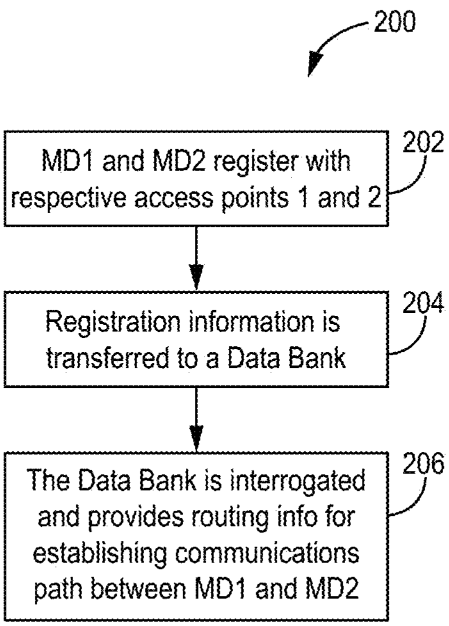
FIG. 2 is a flow diagram illustrating steps that may be taken in order to establish communications between MD1 and MD2 solely via access points and devoid of using facilities of a base station tower, according to one example embodiment.

FIG. 2 is a flow chart illustrating a method 200 of that may be taken in order to establish communications between MD1 and MD2 using system 100 solely via access points and devoid of using facilities of a base station tower. At block 202, MD1, being proximate to access point #1 ("AP #1") and able to communicate therewith, via link 107 as is illustrated in FIG. 1, registers with AP #1; similarly, MD2, being proximate to access point #2 ("AP #2") and able to communicate therewith, via link 102 as is illustrated in FIG. 1, registers with AP #2. At block 204, the registration that is performed by MD1 with AP #1 and the registration that is performed by MD2 with AP #2 are respectively relayed by AP #1 to ISP #1 via link 106 and by AP #2 to ISP #2 via link 103 and then, the registrations are relayed to a Data Bank 201 as is illustrated in FIG. 1, via links 105 and 104, respectively. In some embodiments, the registrations performed by MD1 with AP #1 and by MD2 with AP #2 may be relayed directly to the Data Bank 201 by AP #1 and AP #2, respectively. It will be understood that one or more "first devices" other than MD1, that may be proximate to AP #1 and able to communicate therewith, may also register with AP #1; and that one or more "second devices" 110 other than MD2, that may be proximate to AP #2 and able to communicate therewith, may also register with AP #2. As previously indicated, each access point and/or each device that is registered therewith, may be associated with a unique internet protocol ("IP") address. At block 206, in the event that MD1 initiates a communications session with MD2 (by, for example, dialing, or otherwise using, a number and/or identity associated with MD2), the Data Bank 201 may be used/interrogated to reveal an access point (if any) with which MD2 is connected and/or registered with. If such an access point that is associated with MD2 is identified (i.e., an access point with which MD2 is registered is identified), a communications session with MD2 may be established by, for example, informing MD2 of the IP address associated with the access point with which MD1 is connected/registered with. Accordingly, a communications session (including voice and/or data; bidirectionally or unidirectionally) between MD1 and MD2 may be established while avoiding using facilities of a base station tower and/or avoiding using cellular frequencies associated therewith. In some embodiments, facilities of a base station tower may be used if, for example, at least one of MD1 and MD2 is not registered with an access point.

Given that signals used to communicate wirelessly between an access point and a mobile device may be low-power signals that may be used over-and-over again over a geographic area while maintaining an acceptable level of interference, a frequency content of such signals may not need to be restricted via the use of a vocoder. Consequently, a processing delay due to a vocoder may be reduced or eliminated by using a vocoder that is less compressive than an alternative (or by not using a vocoder at all and transmitting voice uncompressed). Stated differently, using an access point to wirelessly communicate with a mobile device (instead of using a base station) may allow voice to be transmitted absent any compression or vocoding. Accordingly, information relating to transmission of voice may be received by an access point and routed to a destination via cable (copper and/or fiber optical) and/or microwave.

If the destination device is connected to an access point, the voice may be transmitted to the access point uncompressed and presented by the access point to the destination device uncompressed. Alternatively, if the destination device is connected to a base station, not to an access point, then the voice may be presented by the base station to the destination device uncompressed (if so chosen) or voice may be compressed and then presented by the base station to the destination device. The "uncompressed" vs. "compressed" decision for delivering voice to the destination device may depend upon, for example, an operator's decision (as may, for example, relate to a competitive advantage for the operator) and/or a subscriber's decision as may, for example, relate to a quality of service issue and/or less delay for the subscriber. In accordance with some embodiments, delivering voice uncompressed comprises using an analog-to-digital ("A/D") converter to transform voice from an analog (e.g., continuous-time) representation to a digital (e.g., discrete-time) representation. According to some embodiments, an eight-bit (8-bit) A/D converter may be used to transform the voice from the analog to the digital representation and uncompressed voice may be transmitted at a bit rate that is greater than or equal to 64,000 bits per second (64 kbps). Voice may be transmitted uncompressed using a packet-switched network and/or a protocol that is associated with and/or relates to the internet, such as an Internet Protocol ("IP"). Voice may be transmitted uncompressed in order to reduce a processing delay that is associated with voice compression. Accordingly, a device (such as MD1 and/or MD2) may be configured to include at least one vocoder and to use the at least one vocoder to compress voice responsive to the voice being transmitted to a destination device using facilities of a base station and/or cellular frequencies associated therewith warranting voice compression in order to reduce a resource (e.g., frequencies) being used for the transmission. Further, the device may be configured to by-pass (i.e., not to use) the at least one vocoder and to transmit voice uncompressed to the destination device responsive to the device and/or the destination device having registered with an access point and/or responsive to at least one other factor; wherein, in some embodiments, the at least one other factor comprises a quality-of-service that is being sought, a time of day, a promotion that is being offered by an operator, a reduction of delay that is being sought and/or a competitive advantage that is being sought.

According to some embodiments, a first voice compression may be performed whereby, following the first voice compression, voice may be transmitted at a bit rate that is greater than or equal to 32,000 bits per second (32 kbps) but less than or equal to 64,000 bits per second (64 kbps). In further embodiments, a second voice compression may be performed whereby, following the second voice compression, voice may be transmitted at a bit rate that is greater than or equal to 16,000 bits per second (16 kbps) but less than or equal to 64,000 bits per second (64 kbps). A variable-rate vocoder may be used, in some embodiments, to provide a voice compression comprising a variable bit rate that is responsive to an operator's competitive advantage being sought by the operator, availability of a frequency resource, a level of interference and/or a profile of a customer of the mobile device (smartphone) which includes the variable-rate vocoder.

According to some embodiments comprising transmitting (uncompressed or partially compressed) voice using a packet-switched network and/or a protocol that is associated with and/or relates to the internet, in lieu of the above or in combination with the above, a device (such as MD1) and/or an access point (such as AP #1) with which the device is connected to and is communicating with, may allocate a specific set of frequencies for transmission of voice (and/or other data) for the duration of the communications session including for intervals thereof which are devoid of voice being transmitted. For example, as is the case with conventional "plain old telephone service" (or "POTS"), wherein a resource is allocated and dedicated to a telephone call, for the entire duration of the telephone call (i.e., a "telephone circuit" is allocated to the telephone call for the entire duration of that telephone call and is, therefore, unavailable for other purposes until the telephone call ends), independently of any voice activity on the telephone call, here too, in transmitting voice using a packet-switched network, resources may be allocated and dedicated to a phone call (that may also include other data) for the duration of the phone call (and/or said other data), independent of activity (e.g., voice activity) thereon.

Accordingly, in some embodiments, as MD1 initiates a communications session between MD1 and MD2, in coordination with an access point (AP #1) with which MD1 is connected to, registered with and/or communicating with, and according to further embodiments, in coordination with the destination device (MD2) and/or an access point (AP #2) with which the destination device is connected to, registered with and/or communicating with, MD1 may allocate (or may be allocated) a number of time-frequency resources, such as, for example, one or more orthogonal frequency division multiplexed ("OFDM") carriers (or subcarriers), or one or more orthogonal frequency division multiple access ("OFDMA") carriers (or subcarriers) or one or more single carrier frequency division multiple access ("SC-FDMA") carriers (or subcarriers) in order to conduct a communications session, comprising voice communications; wherein said allocation of time-frequency resources may be for the duration of the communications session, independently of any level of activity (e.g., independently of any level of voice activity), or absence thereof. Accordingly, a signaling/processing delay that may be associated with allocating a first resource in order to accommodate a first activity (e.g., a first voice activity) over a first interval of time, followed by using the first resource for some other purpose absent activity (e.g., absent voice activity) over a second interval of time, and then having to reallocate the first resource (or some other "third" resource), over a third interval of time to accommodate a third activity (e.g., a third voice activity), may be avoided. Stated differently, according to some embodiments, in order to improve a quality measure of voice, a resource, such as, for example, a frequency resource, that is allocated to a packet-switched connection in order to communicate voice over the packet-switched connection, may be held-on, maintained and/or not released for a duration (that may be an entire duration) of the packet-switched connection that, according to some embodiments comprises an interval of time including periods of time of varying voice activity and/or periods of time that are devoid of voice activity. Thus, a bandwidth, frequency resource and/or set of frequencies (e.g., carriers, subcarriers) that is/are allocated to a packet-switched connection for the communications of voice, may remain invariant for the duration of the packet-switched connection; wherein said duration may be the entire duration associated with the packet-switched connection, spanning a time interval from the establishment thereof (e.g., from dialing of a phone number), to a tearing-down thereof (e.g., till hanging-up).

In order to further improve a quality measure (e.g., a quality-of-service) of voice that is transmitted over a packet-switched connection, in some embodiments, voice may be transmitted over the packet-switched connection uncompressed. According to some embodiments, a device that is transmitting the voice may include a vocoder that may be used to compress the voice by reducing a bit rate that is associated therewith. However, according to some embodiments, the device that is transmitting the voice may, responsive to certain conditions, be configured to by-pass the vocoder and not subject the voice to compression (i.e., to avoid subjecting the voice to a reduction of bit rate associated therewith). Said certain conditions may, according to some embodiments, comprise a registration with an access point, a user profile that relates to an improved quality-of-service and/or an operator decision to offer an improved quality-of-service for, for example, competitive reasons during, for example, certain time intervals of the day such as, for example, during intervals of low usage.

In reference to FIG. 1, MD1 is illustrated as being connected to and/or having registered with AP #1 of ISP #1 whereas MD2 is illustrated as being connected to and/or having registered with AP #2 of ISP #2. As is further illustrated in FIG. 1, AP #1 may be associated uniquely with IP Address #1 ("IPA #1") and AP #2 may be associated uniquely with IP Address #2 ("IPA #2"). According to some embodiments, MD1 may also be associated uniquely with an IP address ("IPMD1"); and MD2 may be associated uniquely with an IP address ("IPMD2"). According to some embodiments, upon establishing by a mobile device, such as, for example, mobile device MD1, connectivity/registration with an access point, such as, for example, with access point AP #1, the Data Bank that is illustrated in FIG. 1 may be informed of an association (e.g., a connectivity) between, for the present example, MD1 and AP #1. Similarly, upon establishing by the mobile device MD2, connectivity/registration with an access point, such as the access point AP #2, the Data Bank may be informed of an association (e.g., a connectivity) between MD2 and AP #2. Accordingly, upon dialing and/or selecting by MD1 a phone number/coordinate/identity associated with MD2 (and/or upon specifying by MD1 an IP address associated with MD2), the Data Bank may be interrogated to provide information as to the whereabouts of MD2 and, having knowledge by the Data Bank of MD2 having connected/registered and capable of communicating with AP #2, may route information transmitted by MD1 to AP #2 so that said information may then be relayed by AP #2 to MD2.

Figure 3:
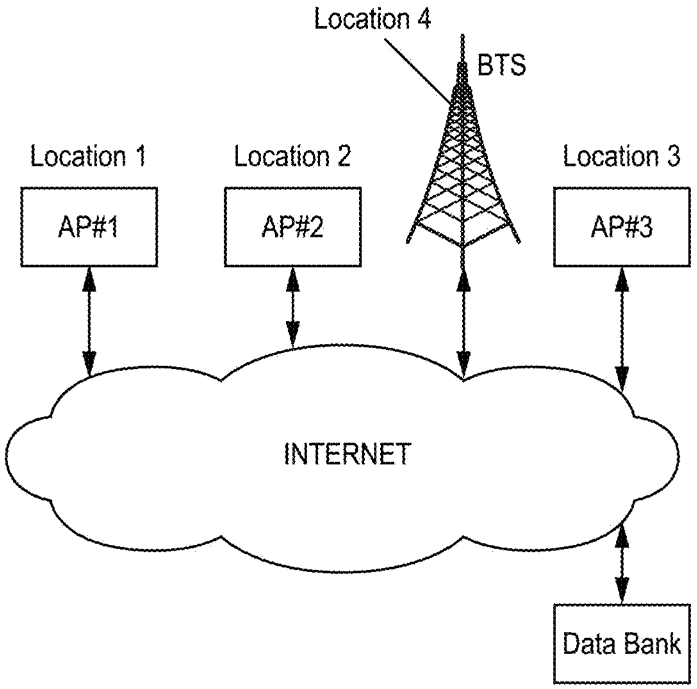
FIG. 3 is a block diagram illustrating a hybrid system/method whereby a mobile device may move, register and/or de-register over a plurality of access points and/or a plurality of base stations (only one of which is shown), according to one example embodiment.

In situations where, for example, a device moves from a first location to a second location, a de-registration of the device at/from the Data Bank may take place, as the device no longer is able to maintain connectivity with a first access point. Then, the de-registration may be followed by a re-registration of the device at the Data Bank (or an alternate Data Bank; there may be a plurality of Data Banks associated with a respective plurality of areas) as the device achieves connectivity with a second access point. It will be understood that an internet service provider (such as, for example, ISP #1 or ISP #2 of FIG. 1) may comprise one or more Data Banks that may be located over one or more respective service locations of that service provider; wherein, according to some embodiments, said one or more Data Banks is/are used solely by that service provider; i.e., sharing of resources of a Data Bank between a plurality of service providers is not practiced. However, FIG. 1 illustrates an embodiment wherein sharing of resources of a Data Bank between two different service providers is practiced. Further, those skilled in the art will appreciate that various concepts/methods/systems from cellular (such as, for example, concepts/methods/systems relating to home location register ("HLR") and/or visitor location register ("VLR")) may be used with concepts/methods/systems disclosed herein to identify a location of a mobile device in order for a call to that mobile device may be delivered thereto via an access point with witch the mobile device is registered with and connected to and/or via a base station with witch the mobile device is registered with and connected to. FIG. 3 illustrates a hybrid system/method whereby a mobile device may move, register and/or de-register over a plurality of access points and/or a plurality of base stations (only one of which is shown). The Data Bank illustrated in FIG. 3 comprises a hybrid Data Bank comprising components that track/register/de-register a mobile device as it moves between access points, from an access point to a base station, between base stations and/or from a base station to an access point.

FIG. 3 is a block diagram illustrating four areas/locations wherein AP #1 is associated with Location 1, AP #2 is associated with Location 2, AP #3 is associated with Location 3 and wherein a base station, labeled as BTS in FIG. 3, is associated with (and is serving) Location 4. A mobile device, such as, for example, the mobile device MD1 of FIG. 1, may, over a first interval of time, be within Location 1 and connected with AP #1, and may thus be registered at the Data Bank as being associated with AP #1. Then, MD1 may move and may, over a second interval of time be within Location 2 and connected with AP #2. Accordingly, as MD1 moves and is no longer connected with AP #1, a de-registration of MD1 may take place at the Data Bank whereby MD1 is dissociated (i.e., de-associated) from AP #1. As MD1 attains connectivity with AP #2 in Location 2, MD1 registers with the Data Bank as being associated, and capable of communicating, with AP #2. Then, MD1 may move again and may, over an interval of time be within Location 4 and connected with the BTS. Accordingly, as MD1 moves and is no longer connected with AP #2, a de-registration of MD1 may take place at the Data Bank whereby MD1 is dissociated (i.e., de-associated) from AP #2 and, given that now MD1 is connected, and able to communicate, with the BTS in the new location (Location 4), MD1 registers with the Data Bank as being associated, and capable of communicating, with the BTS. It will be understood that, according to some embodiments, a registration of MD1 as being associated, and able to communicate, with the BTS may use facilities of (and be at) a Data Bank that differs from a Data Bank being used for registrations and/or de-registrations having to do with access points. According to other embodiments, the same Data Bank may be used for access point and base station registrations/de-registrations. Accordingly, in some embodiments, the Data Bank block of FIG. 3 may include first and second Data Banks; wherein the first Data Bank is associated with access points and wherein the second Data Bank is associated with base stations. It will be understood that as MD1 moves over the various locations illustrated in FIG. 3, one or more hand-overs (or registrations/de-registrations) from a first access point to a second access point and/or from an access point to the BTS (or from the BTS to an access point) may take place during the duration of a call, while maintaining and not dropping the call (as those skilled in the art can appreciate). In some embodiments, MD1 maintains registration with the BTS as MD1 moves over Locations 1-3, if Locations 1-3 are within the service area of the BTS. Accordingly, MD1 may resort to communications via the BTS (or maintaining communications via the BTS and avoiding dropping a call in-progress) as MD1 moves over the Locations 1-3. Thus, according to some embodiments, whenever MD1 is capable of communicating via an access point (AP #1-AP #3) it may preferentially do so while, continuing to maintain connectivity, and in some embodiments continuing communicating with the BTS and with an access point, simultaneously, as necessary, for diversity reasons.

Referring back to FIG. 1, it will be understood that links 101, 102 and/or 107 may be short-range WiFi- and/or Bluetooth-based wireless links comprising licensed and/or unlicensed frequencies. As those skilled in the art can appreciate, these links, owing to their short-range and low-power nature, may be allocated a sufficiently large set of frequencies (e.g., a sufficiently large number of OFDM/OFDMA/SC-FDMA subcarriers) in order to provide an improvement in voice/data communications comprising a reduction in delay as is further discussed below. Still referring to FIG. 1, links 103, 104, 105 and/or 106 may comprise wireless and/or cable links wherein the wireless links comprise microwave links and the cable links comprise fiber-optical cable links and/or coper cable links. In reference to FIGS. 1 and 3, it will be understood that at each arrow tip there is structure of a receiver and/or a transmitter. Said structure of a receiver and/or a transmitter may comprise an antenna, a modulator, a processor and/or other components that may be necessary for the receiver and/or transmitter, as those skilled in the art know. In FIG. 1, it will be understood the arrow tip that enters Customer #1, via link 106, connects to AP #1. Similarly, it will be understood that the arrow tip that enters Customer #2, via link 103, connects to AP #2.

Accordingly, a method of wirelessly transmitting a voice segment may be provided; the method comprising: preferentially establishing a wireless link between a mobile device and an access point responsive to having detected a signal associated with the access point; and wirelessly transmitting information comprising the voice segment from the mobile device to the access point; or establishing a wireless link between the mobile device and a base station responsive to having detected a signal associated with the base station absent having detected the signal associated with the access point; and wirelessly transmitting information comprising the voice segment from the mobile device to the base station; wherein said wirelessly transmitting information comprising the voice segment from the mobile device to the access point comprises wirelessly transmitting the voice segment from the mobile device to the access point using a first data rate; wherein said wirelessly transmitting information comprising the voice segment from the mobile device to the base station comprises wirelessly transmitting the voice segment from the mobile device to the base station using a second data rate; and wherein the first data rate is greater than the second data rate. It will be understood that said "preferentially establishing a wireless link between a mobile device and an access point" means preferring/selecting to establish the link between a mobile device and the access point even though there may be other choices for establishing said link (e.g., between the mobile device and a base station).

Further to the method of wirelessly transmitting, as recited above, and analogously therewith, a method of wirelessly receiving a voice segment may be provided; the method comprising: preferentially establishing a wireless link between a mobile device and an access point responsive to having detected a signal associated with the access point; and wirelessly receiving information comprising the voice segment at the mobile device from the access point; or establishing a wireless link between the mobile device and a base station responsive to having detected a signal associated with the base station absent having detected the signal associated with the access point; and wirelessly receiving information comprising the voice segment at the mobile device from the base station; wherein said wirelessly receiving information comprising the voice segment at the mobile device from the access point comprises wirelessly receiving the voice segment at the mobile device from the access point using a first data rate; wherein said wirelessly receiving information comprising the voice segment at the mobile device from the base station comprises wirelessly receiving the voice segment at the mobile device from the base station using a second data rate; and wherein the first data rate is greater than the second data rate.

In addition, a method of wirelessly communicating (transmitting/receiving) a voice segment may be provided; the method comprising: establishing a wireless link between a mobile device and an access point and/or a base station; and wirelessly communicating information comprising the voice segment between the mobile device and the access point and/or the base station; wherein said wirelessly communicating information comprising the voice segment comprises allocating a resource for said wirelessly communicating the voice segment and using the resource substantially throughout a duration of the voice segment even though the voice segment comprises an interval that is devoid of voice activity; wherein the resource comprises a frequency resource. It will be understood that, according to some embodiments, said mobile device may not be mobile but may be substantially fixed in a location associated therewith (e.g., a desk-top computer).

As those skilled in the art can appreciate, any resource (such as frequencies) that is allocated and used to communicate between a device and an access point is only used locally (and at a relatively low power level) and can, therefore, be reused repeatedly over a geographic area. Accordingly, such a resource may be allocated liberally for voice communications between a device (such as, for example, a smartphone) and an access point. In some embodiments, High Definition voice may be transmitted between a smartphone and an access point, devoid of processing by a vocoder, by using an appropriately broad/large set of frequencies (e.g., a sufficiently large number of OFDM/OFDMA/SC-FDMA subcarriers), while maintaining said liberal allocation of said sufficiently broad/large set of frequencies over an entire duration of speech even though said entire duration of speech includes pauses, thus reducing processing delay in speech/voice communications and improving a quality of service measure (by increasing intelligibility while reducing delay) for users. It will be understood that any of the principles disclosed herein, any variation thereof and/or any combination thereof, may be used in/for any method/system involving voice and/or data communications (including methods/systems involving two-way/interactive television) to provide one or more of the quality-of-service improvements mentioned above.

It will be understood that, in addition to the methods recited above and/or in addition to any variation and/or combination thereof, systems analogous to such methods may also be provided. It will also be understood that the term access point, as used herein, refers to a device that may be installed in a home, office, on a light post, on a building or other structure and is connected to a facility of a service provider via a microwave link, a fiber optical link and/or a cable link (that may comprise a copper cable link); wherein the access point is configured to provide wireless communications to one or more devices that may comprise one or more mobile devices over a service region of the access point. In contrast, the term base station (or BTS), as used herein, refers to equipment comprising a sectorized antenna that is situated at a tower top, a building, at a water tower or other structure, and is configured to provide wireless communications to one or more devices that may comprise one or more mobile devices over a service region of the base station; wherein said service region of the base station comprises a geographic area that is larger than a geographic area associated with said service region of the access point; and wherein the service region of the access point may, according to some embodiments, be included within the service region of the base station. Further, it will be understood that the term voice segment refers to a phone conversation during which an exchange of information takes place via use of the English language, any other language and/or any other convention of sounds, between humans or between a human and a machine, irrespective of a duration associated with the voice segment and irrespective of a continuity or discontinuity associated therewith that may comprise voice inactivity (i.e., silence) over one or more intervals of time.

Definitions/Conventions

The term "therebetween", as may be used herein, means "with one another." For example, the sentence "it is expected that wireless devices will continue to proliferate with increasing connectivity therebetween" means "it is expected that wireless devices will continue to proliferate with increasing connectivity with one another." Similarly, "orthogonal therebetween" means orthogonal with one another and "devoid of interference therebetween" means devoid of interference with one another.

It will be understood that when an element is referred to as being "connected" or "coupled" to another element, it can be directly connected or coupled to the other element or intervening elements may be present. Furthermore, "connected" or "coupled" as used herein includes wirelessly connected or coupled.

The terminology used herein is for the purpose of describing particular embodiments only and is not intended to be limiting of the inventive concepts. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although terms such as "first" and "second" may be used herein to describe various elements and/or signals, these elements/signals should not be limited by these terms. These terms are only used to distinguish one element/signal from another element/signal. Thus, a first element/signal could be termed a second element/signal, and a second element/signal may be termed a first element/signal without departing from the teachings of the present inventive concepts, as will be appreciated by those skilled in the art.

As used herein, the term "and/or" includes any and all combinations of one or more of the associated listed items. The symbol "/" may also be used as a shorthand notation for "and/or".

As may be used herein the term "DFT/FFT" refers to Discrete Fourier Transform and/or Fast Fourier Transform and may include any other Fourier transform, discrete and/or otherwise. The term IDFT/IFFT as may be used herein refers to Inverse Discrete Fourier Transform and/or Inverse Fast Fourier Transform and may include any other inverse Fourier transform, discrete and/or otherwise.

As used herein, the term "device", "terminal", "transmitter", "receiver" and/or "transceiver" include(s) transmitters/receivers of cellular and/or satellite terminals with or without a multi-line display or, according to some embodiments, with no display at all; smartphones and/or Personal Communications System (PCS) terminals that may include data processing, facsimile and/or data communications capabilities; Personal Digital Assistants (PDA) that can include a radio frequency transceiver and/or a pager, Internet/Intranet access, Web browser, organizer, calendar and/or a Global Positioning System (GPS) receiver; and/or conventional laptop and/or palmtop computers or other appliances, which include a radio frequency transmitter and/or receiver. As used herein, the term "device", "terminal", "transmitter", "receiver" and/or "transceiver" also include(s) a wireless and/or non-wireless configuration of transmitting/receiving data/information and further includes any other radiator and/or receptor of electromagnetic energy, man-made and/or naturally occurring, that may have time-varying and/or fixed geographic coordinates and/or may be portable, transportable, installed in a vehicle (aeronautical, maritime, or land-based) and/or situated/configured to operate locally and/or in a distributed fashion on earth, in vehicles (land-mobile, maritime and/or aeronautical) and/or in space. A device, terminal, transmitter, receiver and/or transceiver may also be referred to herein as a "base station," "access point," "mobile device," "wireless device," "radiating device," "receiving device," "transmitting device," "radioterminal," "smartphone" and/or simply as a "phone". Any one of the terms such as device, terminal, transmitter, receiver and/or transceiver may be preceded by a term such as "wireless" to denote an untethered configuration thereof that relies upon, at least partially, on an over-the-air transmission and/or reception of electromagnet waves/energy. Similarly, same may be said regarding any one of the terms base station, access point, mobile device, radiating device, receiving device, transmitting device, radioterminal, smartphone, phone, communications device, etc.

It will be understood that the term "substantially overlaps" as may be used herein means that a first set/interval (that is being compared with/to a second set/interval), overlaps with the second set/interval, but there may be a portion thereof such as, for example, at a beginning, an end and/or elsewhere thereat that may not overlap with the second set/interval. The term "substantially the same" may also be used in comparing two entities such as, for example, two air interfaces that may be using similar technologies (e.g., OFDMA) but one may differ from the other in some aspect (e.g., a vocoder, frequencies used). If a first event occurs over a first interval of time, for example, from 6 AM to 10 AM, and a second event occurs over a second interval of time, for example, from 7 AM to 11 AM, then it may be said that the second event substantially overlaps in time with the first event and/or that the first event substantially overlaps in time with the second event. It may also be said that the first and second events are "substantially congruent in time" and/or are "substantially concurrent in time". Further, the term "substantially differ" as may be used herein means that, for example, two or more sets or two or more entities (such as, for example, two or more sets of frequencies) that are being referenced or compared therebetween comprise mutually exclusive elements therebetween (such as, for example, comprising mutually exclusive frequencies therebetween) but may also comprise some elements (e.g., some frequencies) that are common therebetween. For example, a first set of frequencies comprising frequencies from, for example, 1 GHz to 3.1 GHz and a second set of frequencies comprising frequencies, for example, from 3 GHz to 5 GHz substantially differ therebetween. In general, the term "substantially" as used herein means to a great extent, if not entirely or totally.

It would indeed be unduly repetitious/tedious and obfuscating to describe in detail and illustrate every combination, sub-combination and/or variation of embodiments described herein that is/are possible using aspects, alternatives, variations, elements, architectures and/or parameters of embodiments already described above. The present description shall be construed to constitute a complete written description that supports each and every possible combination, sub-combination and/or variation of embodiments described herein and of any combination, sub-combination and/or variation of aspects, architectures, elements and/or parameters associated therewith, and of the manner and process of making and using them, and shall support Claims to any such combination, sub-combination and/or variation.

Specific exemplary embodiments of inventive concepts have been described with reference to the accompanying drawings. These inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. It will be understood that any two or more embodiments of the present inventive concepts as presented herein may be combined in whole or in part to form one or more additional embodiments.

The present inventive concepts have been described/specified with reference to figure(s), block diagram(s), Claim(s) and/or flowchart illustration(s) of methods, apparatus (systems) and/or computer program products according to various embodiments. It is understood that a block of the block diagram(s) and/or flowchart illustration(s), and combinations of blocks in the block diagram(s) and/or flowchart illustration(s), may be implemented by computer program instructions. These computer program instructions may be provided to a processor of a general-purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the figure(s), block diagram(s) and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the figure(s), block diagram(s) and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the figure(s), block diagram(s) and/or flowchart block or blocks.

Accordingly, the present inventive concepts may be embodied in hardware and/or in software (including firmware, resident software, micro-code, etc.). Furthermore, the present inventive concepts may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

It should also be noted that in some alternate implementations, the functions/acts noted in the blocks of the block diagram(s)/flowchart(s) and/or figure(s) may occur out of the order noted in the block diagram(s)/flowchart(s) and/or figure(s). For example, two blocks shown in succession may in fact be executed substantially concurrently or the blocks may sometimes be executed in the reverse order, depending upon the functionality/acts involved. Moreover, the functionality of a given block of the flowchart(s)/block diagram(s) and/or figure(s) may be separated into multiple blocks and/or the functionality of two or more blocks of the flowchart(s)/block diagram(s) and/or figure(s) may be at least partially integrated with one another.

Many different embodiments, besides those described herein, are possible in connection with the above description, drawing(s) and document(s) that have been incorporated herein, by reference, as will be appreciated by those skilled in the art. It would be unduly repetitious and obfuscating to describe/illustrate every combination and sub-combination of these embodiments. Accordingly, the present specification, including the drawings, claims and any cited Application(s) that are assigned to the present Assignee, ENK Wireless, Inc., and are incorporated herein by reference, shall be construed to constitute a complete written description of all combinations and sub-combinations of embodiments and of the manner and process of making and using them, and shall support claims to any such combination and/or sub-combination.

It will be understood that any of the embodiments described herein (or any element/portion of any embodiment described herein) may be combined with any other embodiment (or element/portion thereof) to provide yet another embodiment. The number of different embodiments that are provided by the present inventive concepts are too numerous to list and describe individually and in whole. Those skilled in the art will appreciate that any of the embodiments described herein (or any element/portion of any embodiment that is described herein) may be combined with any other embodiment (or element/portion thereof) to provide yet another embodiment.

In the drawings and specification, there have been disclosed embodiments and, although specific terms are employed, they are used in a generic and descriptive sense only and not for purposes of limitation, the scope of the invention being set forth in the following claim(s).

The electronic devices described herein, including the mobile devices MD1, MD2 and access points AP1, AP2, include components to perform the acts described herein. These components can one or more processing devices for executing instructions. The one or more processing devices can include a general-purpose processor or a special purpose processor. The instructions are stored (or otherwise embodied) on or in an appropriate storage medium or media (such as flash or other non-volatile memory) from which the instructions are readable by the processing device(s) for execution thereby. The devices also include memory that is coupled to the processing device(s) for storing instructions (and related data) during execution by the processing device (s). Memory comprises, in one implementation, any suitable form of random access memory (RAM) now known or later developed, such as dynamic random-access memory (DRAM). In other implementations, other types of memory are used.

The instructions, when executed by the one or more processing devices, cause the one or more processing devices to perform the actions of the device described herein. The devices can also include one or more wireless transceivers for transmitting and receiving wireless signals. Any appropriate wireless transceiver can be used, such as a Wi-Fi, cellular, or other transceiver. The devices can also include one or more network interfaces for transmitting and receiving wired signals. Any appropriate network interface can be used such as an Ethernet-based interface.

What is claimed is:

1. A method comprising:

allocating a resource for communicating real-time voice information between a first device and a second device via a packet-switched connection; and using the resource that has been allocated and transmitting a first plurality of packets comprising first real-time voice information that is based on a first voice activity that is detected over a first interval of time; then over a second interval of time that follows the first interval of time, is devoid of any detected voice activity and is further devoid of any real-time voice information packets associated therewith to be transmitted, maintaining unaltered the resource that has been allocated for communicating real-time voice information between the first device and the second device and refraining from using the resource for any purpose other than for said communicating real-time voice information between the first device and the second device; and then using the resource that has been allocated and maintained unaltered and unused over the second interval of time, and transmitting a second plurality of real-time voice information packets based on a second voice activity that is detected over an interval of time that follows the second interval of time.

2. The method according to claim 1, further comprising:

by-passing a signal processing component of the first device and/or of the second device; and causing a delay that is associated with said communicating real-time voice information between the first device and the second device to be reduced.

3. The method according to claim 1, further comprising:

receiving registration information from the first device;

receiving registration information from the second device; and establishing a communications path between the first device and the second device devoid of using any cellular base station to receive and/or to transmit information associated with said communications path.

4. The method according to claim 2, wherein said by-passing a signal processing component of the first device and/or of the second device comprises:

by-passing at least one vocoder of the first device and/or of the second device;

generating a digital representation of voice by using an analog-to-digital converter; and transmitting a bit rate comprising said digital representation of voice that is provided at an output of the analog-to-digital converter.

5. The method according to claim 1, wherein said maintaining unaltered the resource that has been allocated for communicating real-time voice information between the first device and the second device and refraining from using the resource for any purpose other than for said communicating real-time voice information between the first device and the second device comprises:

keeping the resource, that has been allocated and has been used to transmit the first plurality of packets comprising the first real-time voice information, unaltered and not used for any other purpose over the second interval of time even though the second interval of time is devoid of any detected voice activity and is further devoid of any real-time voice information packets associated therewith to be transmitted; and responsive to said keeping the resource, avoiding a delay by refraining from having to reallocate the resource and/or allocate any other resource in order to transmit said second plurality of packets.

6. A first device that is configured to communicate with a second device and is configured to perform operations comprising:

receiving a resource for communicating real-time voice information to/from a second device via a packet-switched connection;

detecting, over a first interval of time, first real-time voice information and generating a first plurality of packets comprising the first real-time voice information that is detected; and transmitting the first plurality of packets comprising the first real-time voice information over the packet-switched connection using the resource; then over a second interval of time that follows the first interval of time, is adjacent thereto and is devoid of any real-time voice activity, maintaining the resource even though the second interval of time is devoid of any real-time voice information packets associated therewith to be transmitted; then over a subsequent interval of time that is adjacent to the second interval of time, detecting second real-time voice information and generating a second plurality of packets comprising the second real-time voice information that is detected over said subsequent interval of time; and transmitting the second plurality of packets comprising the second real-time voice information over the packet-switched connection using the resource.

7. The first device according to claim 6, wherein the operations further comprise:

by-passing a signal processing component; and reducing a delay associated with said transmitting the first and/or second plurality of packets comprising the first and/or second real-time voice information, respectively, over the packet-switched connection using the resource.

8. The first device according to claim 6, wherein the operations further comprise:

registering with an access point of an internet service provider and causing registration information to be transferred to a data bank.

9. The first device according to claim 7, wherein said by-passing a signal processing component comprises:

by-passing at least one vocoder;

generating a digital representation of voice by using an analog-to-digital converter; and transmitting a bit rate comprising said digital representation of voice that is provided at an output of the analog-to-digital converter.

10. The first device according to claim 6, wherein said maintaining the resource even though the second interval of time is devoid of real-time voice information packets associated therewith to be transmitted comprises:

keeping the resource over the second interval of time even though the second interval of time is devoid of real-time voice activity; and then reducing a delay by refraining from engaging in an operation of receiving the resource and/or any other resource in order to transmit the second plurality of packets.

11. A method comprising:

allocating a resource for communicating voice information over a packet-switched connection between a first device and a second device;

transmitting using the resource, over the packet-switched connection and over a first interval of time, a first plurality of packets associated with first voice activity that is detected over the first interval of time;

maintaining allocation of the resource during a second interval of time that immediately follows the first interval of time even though the second interval of time is devoid of any detected voice activity; and over the second interval of time, maintaining unaltered the resource that has been allocated for communicating voice information between the first device and the second device and refraining from using the resource for any purpose other than for said communicating voice information between the first device and the second device; and then during an interval of time that immediately follows the second interval of time and comprises voice activity, transmitting a second plurality of voice packets that are associated therewith over the packet-switched connection using the resource.

12. The method according to claim 11, wherein the first device comprises a smartphone and/or the second device comprises a smartphone.

13. The method according to claim 11, wherein the first plurality of packets comprises a first uncompressed representation of voice activity and is devoid of processing by a vocoder; and wherein the second plurality of packets comprises a second uncompressed representation of voice activity and is devoid of processing by a vocoder.

14. The method according to claim 13, wherein the first uncompressed representation comprises a bit rate that is associated with a discrete-time representation of voice activity as provided at an output of an analog-to-digital converter; and wherein the second uncompressed representation comprises a bit rate that is associated with a discrete-time representation of voice activity as provided at the output of the analog-to-digital converter.

15. The method according to claim 11, wherein said maintaining allocation of the resource during a second interval of time that immediately follows the first interval of time even though the second interval of time is devoid of any detected voice activity; and over the second interval of time, maintaining unaltered the resource that has been allocated for communicating voice information between the first device and the second device and refraining from using the resource for any purpose other than for said communicating voice information between the first device and the second device comprises:

avoiding a delay by refraining from having to reallocate the resource and/or allocate any other resource in order to transmit said second plurality of voice packets that is associated with said interval of time that immediately follows the second interval of time.

16. A wireless communications device that is configured to perform operations comprising:

receiving a resource for communicating voice information over a packet-switched connection between the wireless communications device and a second device;

detecting a first voice activity during a first interval of time, forming a first plurality of packets comprising the first voice activity and transmitting the first plurality of packets over the packet-switched connection using the resource that has been received; then during a second interval of time, that follows the first interval of time and is adjacent thereto, maintaining unaltered the resource that has been received even though there is no voice activity detected during said second interval of time and the second interval of time is devoid of any voice-related packets to be transmitted; and then detecting a second voice activity during an interval of time that follows the second interval of time and is adjacent thereto, forming a second plurality of packets comprising the second voice activity and transmitting the second plurality of packets over the packet-switched connection using the resource that has been received and has been maintained.

17. The wireless communications device according to claim 16, wherein the wireless communications device comprises a smartphone.

18. The wireless communications device according to claim 16, wherein said operations further comprise:

by-passing at least one signal processing component; and reducing a processing delay associated with said transmitting the first and/or the second plurality of packets.

19. The wireless communications device according to claim 18, wherein said operations further comprise:

by-passing at least one vocoder;

generating a digital representation of voice by using an analog-to-digital converter; and transmitting a bit rate comprising said digital representation of voice that is provided at an output of the analog-to-digital converter.

20. The wireless communications device according to claim 16, wherein said maintaining unaltered the resource that has been received even though there is no voice activity detected during said second interval of time and the second interval of time is devoid of any voice-related packets to be transmitted comprises:

keeping the resource and reducing a delay by refraining from engaging in an operation of receiving the resource and/or any other resource for transmitting the second plurality of packets.

21. The wireless communications device of claim 16, wherein said resource comprises a frequency resource comprising unlicensed and/or licensed frequencies.

* * * * *